Aug. 13, 1968    G. W. PERKINS    3,396,766
ARTICHOKE MACHINE

Filed Aug. 22, 1966    4 Sheets-Sheet 1

INVENTOR.
GRANVILLE W. PERKINS
BY
ATTORNEYS

INVENTOR.
GRANVILLE W. PERKINS

Aug. 13, 1968

G. W. PERKINS 3,396,766

ARTICHOKE MACHINE

Filed Aug. 22, 1966

INVENTOR.
GRANVILLE W. PERKINS
BY
ATTORNEYS

United States Patent Office 3,396,766
Patented Aug. 13, 1968

3,396,766
ARTICHOKE MACHINE
Granville W. Perkins, Castroville, Calif., assignor to Artichoke Industries, Inc., a corporation of California
Filed Aug. 22, 1966, Ser. No. 573,939
4 Claims. (Cl. 146—52)

This invention relates to a machine for preparing artichokes and more particularly relates to an automatic machine which will cut off the top and bottom leaves of an artichoke, round off the butt and cut out the heart of the artichoke, leaving a trimmed heart suitable for freezing, canning, or other further processing.

An object of this invention is to provide an artichoke trimming machine which is capable of operating at a high cyclic rate.

Another object of this invention is to provide such an artichoke machine of generally simplified construction.

Still another object of this invention is to provide a machine having novel form of four jaw chuck which positively grips the artichoke being processed and centers the same.

Another object of this invention is to provide an artichoke preparation machine wherein the knives for cutting the top and bottom leaves from the artichoke are provided with fan blades surrounded by a close fitting housing, resulting in a quick and efficient severing action of the leaves combined with a blower action thus assuring that the severed leaves will not contaminate the final product.

Other objects will be apparent from the balance of the specification which follows.

In the drawings forming part of this application:

Figure 2:
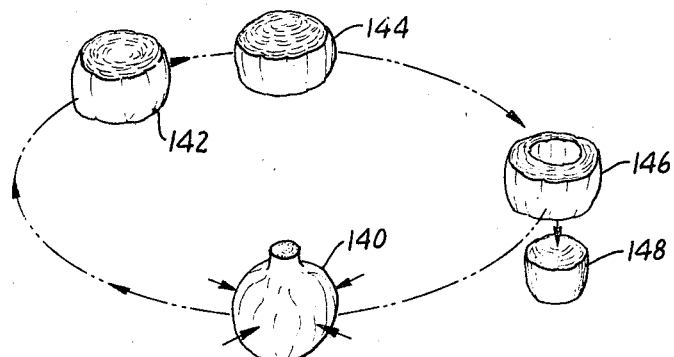
FIGURE 2 is a diagrammatic view showing the various operations which are performed on the artichoke at the several stations of the machine.
Figure 1:
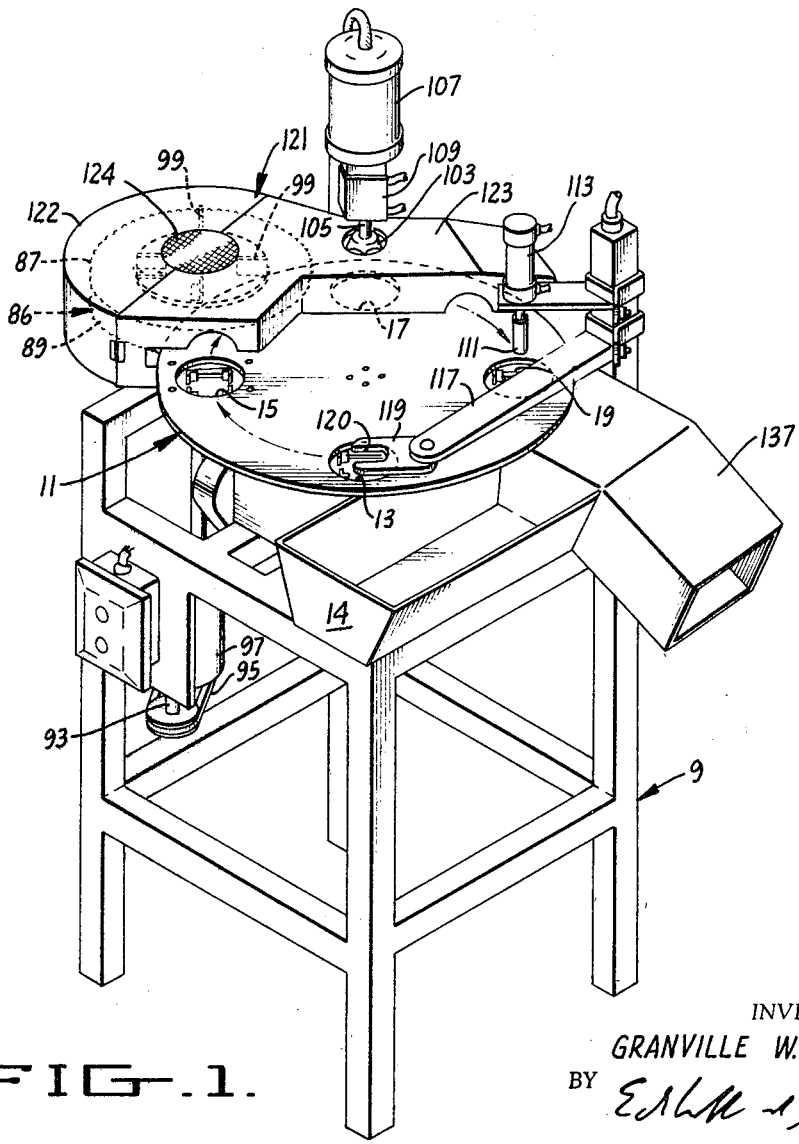
FIGURE 1 is a perspective view of an artichoke preparing machine embodying the present invention.
Figure 3:
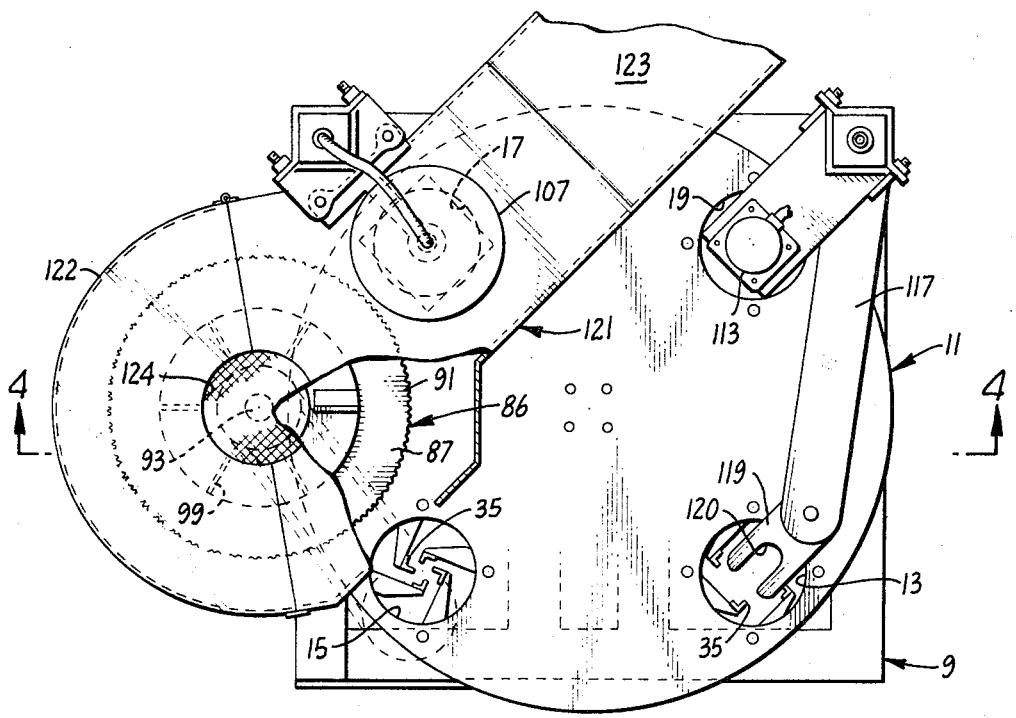
FIGURE 3 is an enlarged plan view of the rotating table and associated equipment for performing the various operations on an artichoke.

Referring now to the drawings by reference characters, there is shown an artichoke preparation machine having a frame work generally designated 9. Mounted upon the framework 9 is a rotating table generally designated 11, having four apertures as at 13, 15, 17, and 19, each of said apertures being provided with an artichoke holding chuck, hereinafter described in detail. The table 11 is mounted for rotation on the hub 21 on shaft 22 which is given an intermittent stop-start motion by means of the gear box 23 driven by means of the prime mover 25. In addition to the stop-start motion imparted to the shaft 22, gear box 23 also provides a synchronized but steady rotational movement on shaft 27 which actuates a plurality of pneumatic valves generally designated 29 and hereinafter described in detail.

Figure 5:
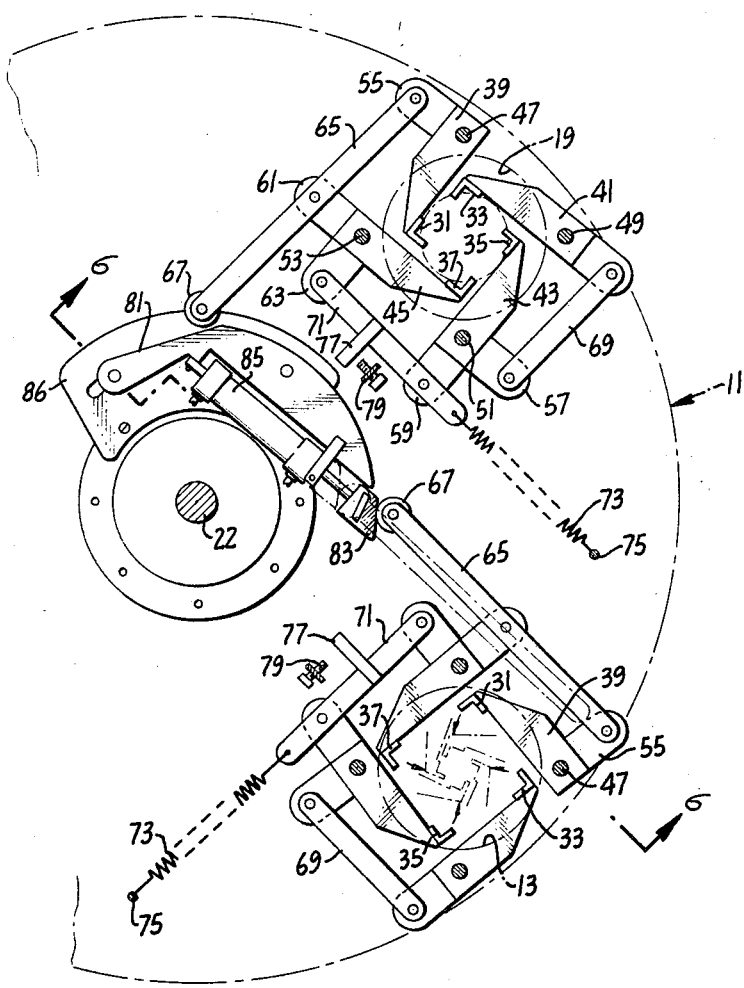
FIGURE 5 is a section on the line 5—5 of FIGURE 4.
Figure 6:
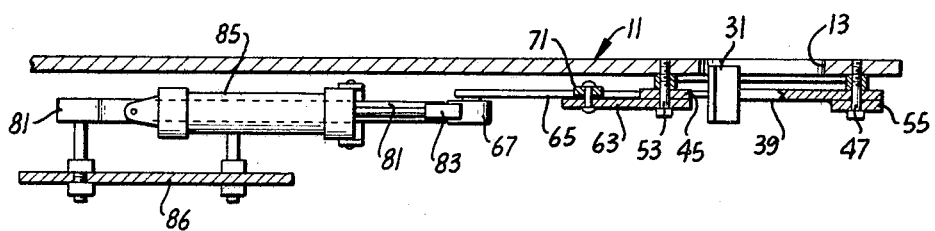
FIGURE 6 is a section on the line 6—6 of FIGURE 5.

As has been said earlier, each of the apertures 13, 15, 17 and 19 in the rotating table 11 is equipped with an artichoke holding chuck and two of these are shown in detail in FIGURE 5. The chuck includes the right angle jaws 31, 33, 35, and 37 which are fastened at the ends of the respective arms 39, 41, 43, and 45. Arms 39, 41, 43, and 45 are pivoted to the table 11 at pivot points 47, 49, 51, and 53, respectively. Arm 39 has a crank arm 55 fixed thereto. Arm 43 has double crank arms 57 and 59 affixed thereto. Arm 45 has double crank arms 61 and 63 affixed thereto. Link 65 joins arms 61 and 55 and terminates in a cam follower 67. Link 69 connects arms 41 and arm 57, while a link 71 connects arms 63 and 59 and has a biasing spring 73 joining the end of the arm to a connection point 75 on table 11. In addition, link 71 has a stop arm 77 which cooperates with an adjustable stop 79 affixed to table 11. Cam 81 lies beneath table 11 and is affixed to the frame member 86 of the machine and extends through roughly 90°. An extension of cam 81 designated 83 is affixed to a pneumatic cylinder 85 in such a manner that it can extend and form a continuation of the surface of cam 81 or can be retracted. It will be apparent that when the cam follower 67 is in contact with the cam 81, the jaws are held in an open position as is shown in solid lines but when the cam follower 67 moves off of the cam, or the segment 83 is withdrawn, spring 73 will close the jaws as is shown in dot-dash lines in the lower portion of FIGURE 5.

Mounted adjacent to rotating table 11 are various devices for performing a series of operations on the artichoke. The first of these is a double rotary knife assembly 86 comprising an upper knife 87 and a lower knife 89, both of which have serrated edges as at 91. The two knives are mounted on shaft 93 which is rotated by means of a belt 95 leading to prime mover 97. The knives are provided with a series of fins, namely upper fins 99 mounted on the blade 87 and lower fins 101 mounted on the blade 89. The fins 99 and 101 act as fan blades and as the artichokes are carried by table 11 between the blades 87 and 89, the stem end and the spiny tip of the artichoke are cleanly severed and the fan blades 99 and 101 blow away the severed leaves, preventing clogging of the knives and also preventing possible contamination of the finished product with cut-up portions of the leaves.

At the next station a tool is provided for removing the outer leaves of the artichoke and for rounding off the bottom of the artichoke heart. The tool comprises a toothed cutter 103 mounted for rotation on shaft 105 and driven by a motor 107. A pneumatic cylinder 109 is provided for raising and lowering tool 103. The operation of this cylinder will be later described.

At the next station, there is provided a punch 111 mounted on a cylinder 113 so that it can be raised and lowered to cut out the heart of the artichoke.

A guide assembly 117 having an adjustable arm 119 having a V-shaped slot 120 may be employed to help in locating the artichoke in the initial loading of the machine.

It will be seen that the knives 91 and 89 as well as the coring tool 103 are located within a housing 121 having a chute 123 leading therefrom. Housing 121 is close fitting as at 122 and has an air inlet 124, so that the assembly acts as a centrifugal fan. By locating these members within the housing, coupled with the action of the fan, both the top, bottom and outer leaves which are cut off are blown off from the respective cutters, preventing contamination of the finished artichocke hearts.

Figure 4:
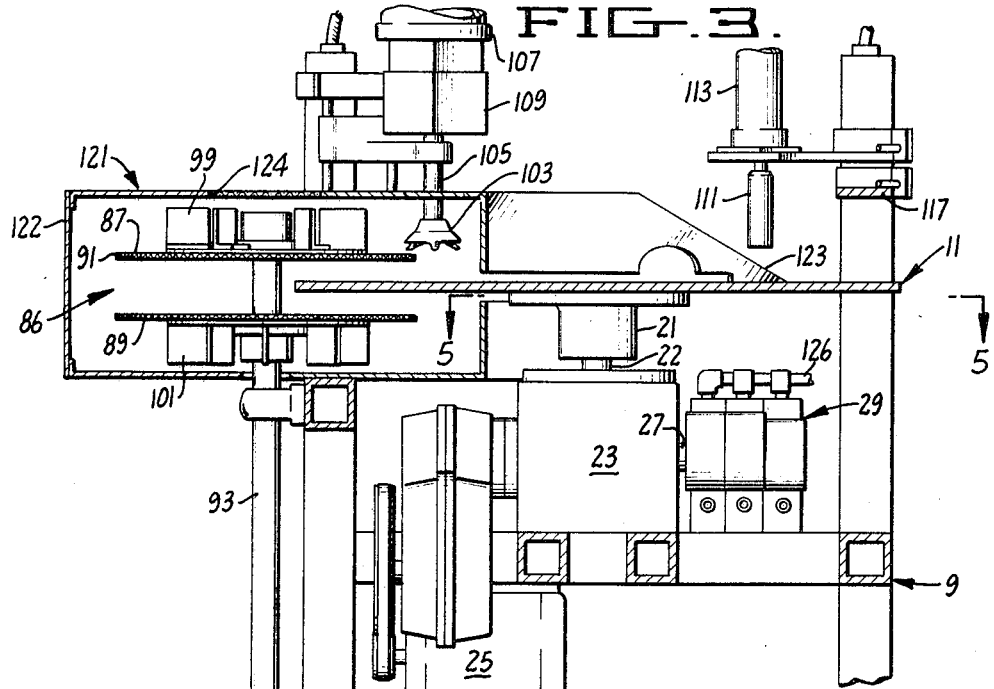
FIGURE 4 is a section on the line 4—4 of FIGURE 3.
Figure 7:
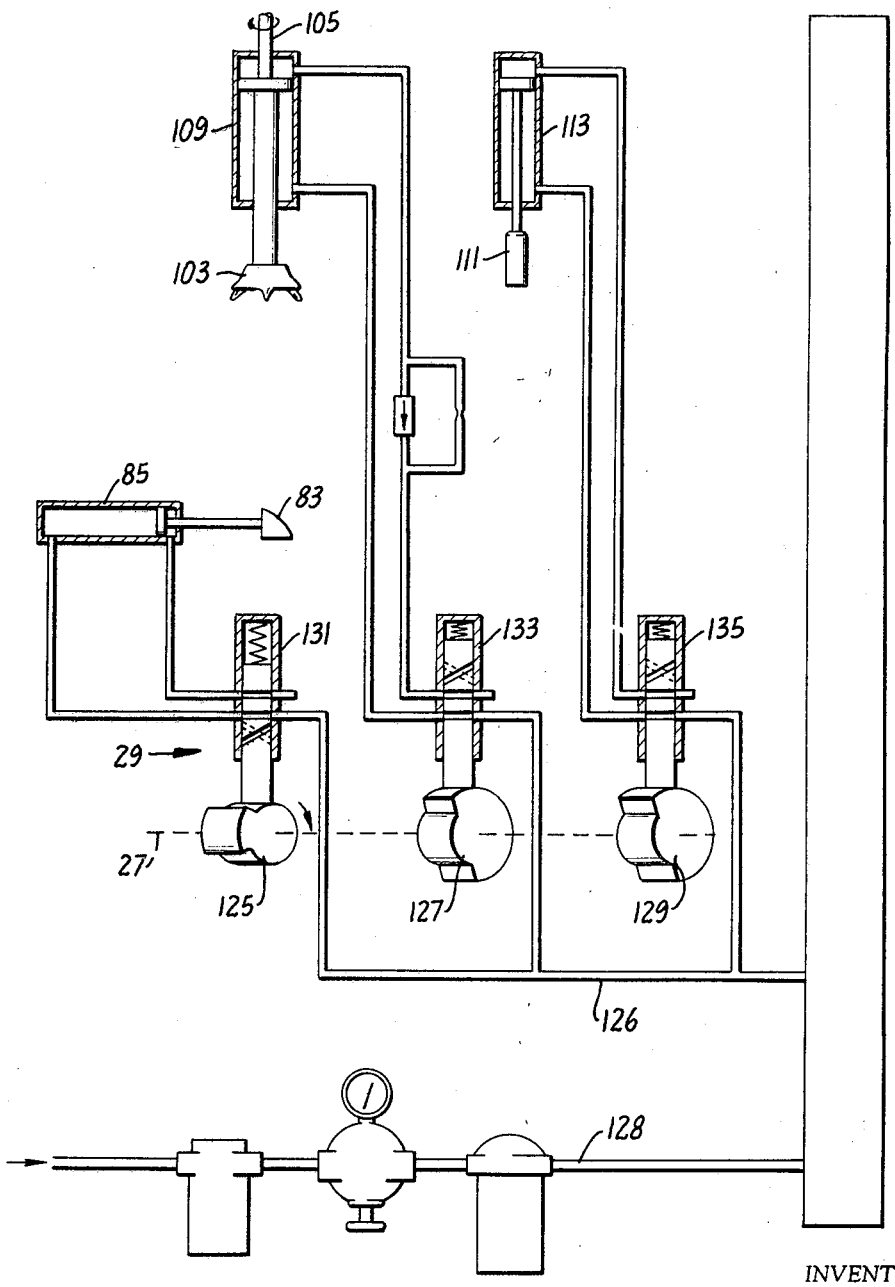
FIGURE 7 is a schematic diagram showing the various cam actuated pneumatic devices on the artichoke machine.

In FIGURE 7, there is shown a cam diagram of the various cams actuating air valves which in turn operate certain pneumatic equipment in conjunction with the artichoke preparation machine. Thus, there are cams 125, 127, and 129 actuating valves 121, 133, and 135 respectively. It will be understood that each of the cams 125, 127, and 129 is physically located on the shaft 27; the assembly of the valves is collectively designated 29 on FIGURE 4. All of the valves are connected through line 126 to a source of regulated, compressed air 128. As can be seen, cam 125 controls valve 131 which in turn actuates cylinder 85 which is adapted to extend or withdraw the cam segment 83. In a similar manner, cam 127 actuates valve 133 which in turn operates cylinder 109 so that the reamer 103 can be raised and lowered. Cam 129 actuates valve 125 which is connected to cylinder 113 to actuate the tool 111 for cutting the heart out of the artichoke.

Having now described the various parts of the machine, the sequence of operations will be described. As one of the chucks rotates to the position in front of the operator, i.e., under the guide 119, the jaws are held in an open position first by the action of cam 81 and then by the action of the cam segment 83. The table 11 then stops in front of the operator and the operator takes an artichoke from bin 14 and inserts it from the bottom of the table with the stem end up into the opening. The adjustable guide 119 aids in placing the artichocke at the desired height. As the operator holds the artichoke in place, cylinder 85 withdraws segment 83 so that the spring 73 now causes the four jaw chuck to close on the artichoke whereupon the operator releases it and all further operations are completely automatic. The wheel now indexes to the next position bringing the artichoke between the saw blades 89, and 87, where the top and bottom leaves are taken off. The table next stops under the tool 103 which descends, cutting away the outer leaves and rounding off the butt. The rotating table 11 then indexes under the tool 111 whereupon cam 129 causes tool 111 to descend into the artichoke, cutting out and discharging the heart. Cam follower 67 then passes on to the raised surface of cam 81 releasing the jaws dropping the outer part of the artichoke so that the outer portion is discharged into chute 137 separately from the heart for further processing.

The operation is shown in diagrammatic form in FIGURE 2. Here an artichoke 140 is first grasped as is shown by the arrows and the bottom and top leaves are cut off at 142 The outer leaves are cut away at 144 and next the outer leaves 146 separated from the heart 148.

It is believed apparent from the foregoing that I have provided an artichoke processing machine of generally improved design and particularly one employing a four jaw chuck which is adapted to grip and hold the artichoke firmly while it is being processed yet which does not injure the artichoke in any manner.

I claim:
1. A machine for processing artichokes comprising in combination:
    (a) a rotating table;
    (b) a plurality of apertures in said table;
    (c) a four jaw chuck in each of said apertures;
    (d) a double rotary knife having one blade above said table and a second blade below said table, said blades being adapted to cut off the tops and bottom leaves of an artichoke held in chuck;
    (e) a rotating cutter mounted over the table;
    (f) means for raising and lowering said cutter;
    (g) a punch mounted over said table, said punch being adapted to press the heart from the artichoke;
    (h) means for raising and lowering said punch; and
    (i) synchronizing means for actuating said chuck and for rotating said table.
2. The structure of claim 1 wherein each of said rotating knives is provided with fan blades with a housing surrounding the fan blades whereby material cut from the artichoke is immediately blown from the vicinity of the artichoke.
3. The structure of claim 1 wherein the chuck comprises 4 pivoted arms terminating in right angle gripping members, said arms being interconnected and provided by a spring bias, said spring bias tending to close said chuck.
4. The structure of claim 3 wherein one of the arms has a cam follower thereon, said cam follower being adapted to move across a cam mounted on a stationary portion of the artichoke machine and wherein said cam includes a movable segment.

References Cited
UNITED STATES PATENTS

| | | | |
|---|---|---|---|
| 2,204,846 | 6/1940 | Dotta | 146—81 |
| 2,687,156 | 8/1954 | Laurence | 146—81 X |
| 2,716,480 | 8/1955 | Dotta | 146—81 X |

JAMES M. MEISTER, *Primary Examiner.*